United States Patent [19]
>
> Dreiseitl et al.
>
> [11] 4,282,473
> [45] Aug. 4, 1981

[54] ROTATING FIELD MACHINE DRIVE AND METHOD

[75] Inventors: Walter Dreiseitl; Dieter Köllensperger; Theodor Salzmann, all of Erlangen; Thomas Schlegel, Hemhofen; Wolf-Dieter Weigel, Kleinsendelbach, all of Fed. Rep. of Germany

[73] Assignee: Siemens Aktiengesellschaft, Munich, Fed. Rep. of Germany

[21] Appl. No.: 58,830

[22] Filed: Jul. 18, 1979

[30] Foreign Application Priority Data

Jul. 31, 1978 [DE] Fed. Rep. of Germany ....... 2833542

[51] Int. Cl.³ .............................................. H02P 7/42
[52] U.S. Cl. .................................... 318/803; 318/805
[58] Field of Search ............... 318/798, 799, 800, 801, 318/802, 803, 805

[56] References Cited

U.S. PATENT DOCUMENTS

| 3,796,935 | 3/1974 | Blaschke | 318/801 |
|---|---|---|---|
| 3,824,437 | 7/1974 | Blaschke | 318/803 |
| 3,851,234 | 11/1974 | Hoffman et al. | 318/800 |
| 3,909,688 | 9/1975 | Blaschke et al. | 318/799 X |
| 4,011,489 | 3/1977 | Franz et al. | 318/798 |
| 4,023,083 | 5/1977 | Plunkett | 318/802 |
| 4,041,361 | 8/1977 | Cornell | 318/802 |
| 4,119,893 | 10/1978 | Bayer et al. | 318/798 X |

FOREIGN PATENT DOCUMENTS

| 1806769 | 11/1968 | Fed. Rep. of Germany | 318/798 |
|---|---|---|---|
| 2362961 | 6/1975 | Fed. Rep. of Germany | 318/799 |
| 2818933 | 4/1978 | Fed. Rep. of Germany | 318/803 |

*Primary Examiner*—S. J. Witkowski
*Assistant Examiner*—Richard M. Moose
*Attorney, Agent, or Firm*—Kenyon & Kenyon

[57] ABSTRACT

A drive for a rotating field machine which has two AC voltage integrators of identical design for forming two electric voltage signals each of which is proportional to a flux component in the machine. Each voltage integrator includes an integrator and a zero-controller having negative feedback for suppressing the DC component of input voltages fed to a summing point of the integrator. Each integrator, is fed, as one input voltage, a voltage proportional to the phase-voltage belonging to the flux component and a voltage proportional to the corresponding stator current in a machine supply lead, for compensating the ohmic stator voltage drop. A second voltage, also depending on the phase current, is processed to compensate for the inductive stator voltage drop. To ensure optimum converter and machine utilization over an increased speed control range by reducing the phase errors of the determined flux components, each zero-controller includes a proportional controller and an integrated controller having output signals fed to the summing point. The output signal of the integrator, corrected for the ohmic stator voltage drop and the inductive stray voltage, is fed, weighted proportionally to the frequency of the machine, to the input of the proportional controller, and weighted proportionally to the square of the frequency, to the input of the integrated controller, the weighting factor having a maximum value of 1.

14 Claims, 5 Drawing Figures

ROTATING FIELD MACHINE DRIVE AND METHOD

BACKGROUND OF THE INVENTION

1. Field of the Invention

This invention relates to a drive for a rotating-field machine, especially a synchronous machine which is supplied from a frequency converter and to a control providing self-controlled, field-oriented operation of the machine. Two AC voltage integrators of identical design are provided for forming two electric voltage signals which are each proportional to a different flux component in the rotating-field machine. Each AC voltage integrator comprises a zero controller having negative feedback for suppressing the DC component of the integrator output voltage, the feedback being connected from the output of the integrator to a summing point at the input of the integrator. A voltage proportional to a Y-voltage belonging to a flux component is connected to each integrator as an input voltage along with a voltage proportional to the corresponding phase current in a machine supply lead to compensate for the ohmic stator voltage drop. Another voltage, dependent on the phase current, for compensating for the reactive (inductive stray) voltage drop, is processed. The invention also relates to a method for operating the rotating-field machine drive.

2. Description of the Prior Art

A rotating field machine drive of this kind is described in German Auslegeschrift No. 26 35 965.

In one known rotating field machine drive, information regarding the position and magnitude of the flux vector in the machine is formed directly from the voltage and current at the terminals. In a three-phase rotating-field machine, it is sufficient to measure the Y-voltage and the phase current twice only and to process them in two AC voltage integrators of identical design connected thereto. In the known rotating-field machine drive, the main field voltage of the machine is determined first by subtracting from a Y-voltage, at a summing point in the input of each AC voltage integrator, a voltage proportional to the ohmic stator voltage drop of the rotating field machine as well as a voltage proportional to the derivative of the stator current with respect to time, to take the reactive (inductive stray) voltage drop into consideration. Subsequently, two of the three flux components in the rotating field machine are determined in the two AC voltage integrators by integration of the main field voltage. These two flux components determine the position and the magnitude of the flux vector.

Information describing the position and the magnitude of the flux vector makes it possible to operate the synchronous machine field-oriented (see Siemens-Zeitschrift 1971, pages 765 to 768 and German Pat. No. 23 53 598).

When starting the synchronous machine, it is of particular importance to determine the flux components as accurately as possible for localizing the position of the rotor. In the worst case, a measuring error can lead to a failure of the synchronous machine to start.

In the rotating field machine drive described in German Auslegeschrift No. 26 35 965, the zero-controller in the DC voltage integrator, consisting of an integrator and a proportional-integral-zero controller with negative feedback, is designed so that it can be disconnected. The zero-controller serves to prevent the output voltage of the integrator from drifting off, due to DC components of the input voltages present at the summing point.

To start the synchronous machine in the rotating field machine drive referred to, the position of the rotor at standstill is determined by first switching on the field excitation, the stator windings being initially not supplied on the converter side. The flux components can then be obtained very precisely from the voltage components induced in the stator windings, when the zero control is disconnected, since the zero drive, if it were connected, would strive to control the starting values determined by the integrator by localizing the position of the induced voltages toward zero, thus falsifying the determination of rotor position. After the stator current is switched on and the synchronous machine has been started, the zero control is then connected, and the DC components of each flux component occurring in normal operation are regulated. However, when the zero control is suddenly connected to the running machine, transients in the nature of a decaying oscillation occur in the control loop and also in the torque. This can temporarily reduce the available torque of the synchronous machine.

In addition, angle and amplitude errors occur, with the zero-controller of the above described rotating field machine drive, which depend on the frequency of the machine. The angle errors, in particular, are significant. Due to the relatively large angle errors, the excitation vector, which has a fixed relation to the flux vector, is not in the desired relationship to the flux vector, with the control concept employed, so that only a reduced component contributes to torque production. As a result, to obtain the needed torque, the converter and the rotating field machine must be designed for larger currents to provide a sufficiently large component of the excitation vector, perpendicular to the flux vector, to accommodate larger angle errors. Heretofore, the capacity of the existing rotating-field machines has been limited by the angle errors.

In addition, stability problems arise in the rotating field machine drive mentioned above, when beats occur between the network and the machine frequency; these problems limit the permissible frequency range. If, for instance, the zero control is designed so that, at an operating frequency of 100 Hz, beat frequencies of 1 Hz are sufficiently damped, then operating at a frequency of 1 Hz is impossible since this frequency is interpreted by the zero controller as an interference frequency and is attenuated beyond the permissible degree.

It is an object of the invention to provide a rotating field machine drive of the type mentioned at the outset having optimum converter and machine utilization in an enlarged speed control range, and in which problems arising from the connecting of the zero control are avoided.

SUMMARY OF THE INVENTION

According to the present invention, the above problem is solved by providing each zero controller with a proportional controller and an integrating controller and by feeding the output signal of the proportional controller and the output signal of the integrating controller to a summing point. The output signals of the integrators, compensated for the ohmic stator voltage drop and the reactive (inductive stray) voltage drop, are fed to the input of the proportional controller, being weighted proportional to the frequency of the rotating flux vector, i.e., to the speed of the rotating field machine, and to the input of the integrating controller, being weighted proportional to the square of the frequency, the weighting factors having a maximum value of 1.

Contrary to the prior art rotating field machine, the invention teaches the use of an AC voltage integrator, which is self-adaptive as to frequency, for determining the rotating flux vector in the rotating field machine drive. In it, the action of the zero-controller is continuously varied, in dependence on the operating frequency of the rotating field machine, in such a way that the amplitude and angle errors remain constant over the entire speed range. An AC voltage integrator having zero control of this kind has a frequency which is variable as a function of the frequency of the rotating flux vector, with constant intercept (through step) frequency and attenuation. The beat frequencies between the converter and the machine, which are of low frequency compared to the operating frequency of the rotating field machine, are sufficiently attenuated by adaptation of the zero control. Because angle errors are small and constant, and since the calculation errors in determining the flux are frequency-independent, the machine and the converter can be fully utilized over the entire frequency range. Also, the process of localizing the rotor position can now be performed in a synchronous machine, as described at the outset, whether it is standing still or running, by switching on the field excitation while the zero-controller remains turned on continuously from the time of starting of the rotating field machine. The transients which occur with the state of the art machine, when the zero control is switched on suddenly, therefore no longer take place.

It is advantageous for the proportional controller of each AC voltage integrator to be preceded by a first multiplier and for the output signal of the first multiplier to be fed to a second multiplier which is in series with the input of the integrating controller. The multiplication factors of the two multipliers are equal and proportional to the frequency of the rotating flux vector or the speed of the rotating field machine. In this simple way, the signal which is fed back via the proportional controller to the input of the integrator is made available, attenuated, at the input of the proportional controller, but increasing in proportion to the frequency of the flux vector of the rotating field machine. The output signal fed back via the integrating controller to the input of the integrator is weighted as the square of the frequency of the rotating flux vector of the rotating field machine by the two multipliers, which are connected in series with respect to the input of the integrating controller. The weighting factor for the input signal of the proportional controller corresponds to the multiplication factor of the first multiplier, and the weighting factor for the input signal of the integrating controller corresponds to the product of the two identical multiplication factors of the multipliers.

It is advantageous to use pulse-width multipliers as multipliers and for a smoothing stage to precede the second pulse-width multiplier. The duty cycles of the pulse-width multipliers are identical and proportional to the frequency of the rotating field machine, and vary between 0 and 1. The voltage output of a pulse-width multiplier is then always the product of the duty cycle and the input voltage of the pulse-width multiplier. In order to square the input voltage of the integrating controller, it is necessary to insert a smoothing stage between the two pulse width multipliers, which are connected in series to the input of the integrating controller.

It is advantageous for the smoothing stage to be a capacitor which is shunted across the feedback resistor of an inverting amplifier following the first pulse width multiplier and to feed the output signal of the inverting amplifier to the inputs of the proportional controller and of the second pulse width multiplier. Thereby, sufficient smoothing is simply obtained. So as to affect the time behavior of the zero-controller as little as possible, it is advantageous to make the capacitance of the smoothing capacitor very small relative to that of the capacitor which determines the time constant of the integrating controller. The lower limit of the capacity of the capacitor is determined by the degree of smoothing required.

In one preferred embodiment, the output signal of a clock generator is fed to the control inputs of FET switches used as the pulse-width multipliers, the duty cycle of the clock generator being proportional to the frequency of the rotating flux vector, i.e., the speed of the rotating field machine. This represents a reliable, cost-effective realization of the pulse-width multiplier.

It is advantageous for the clock generator to be adjustable, as to pulse frequency, below a transition frequency of the rotating flux vector of the rotating field machine, and, as to pulse width, above the transition frequency. This makes possible a very large control range for the duty cycle.

To ensure that the inductive voltage drops of the rotating field machine are taken into consideration by low-cost means, it is advantageous to provide another summing junction at the output of each integrator to which a signal proportional to the integral of the inductive stray voltage drop is fed. This avoids the differentiation of the corresponding phase current with respect to time, described above in German Auslegeschrift No. 26 35 965. The additional summing point is located between the integrator output and the branch of the zero control.

An advantageous method for operating the rotating field machine drive according to the invention consists in performing the following steps in time sequence for starting a synchronous machine:

(a) First, the power supply of the converter control is switched on;
(b) subsequently, the weighting factor is briefly set to the value 1;
(c) the weighting factor is thereupon set to the value corresponding to the frequency of the synchronous machine at that time;
(d) simultaneously, but no earlier, the synchronous machine is excited via the field winding; and
(e) the stator current control is released when the desired flux value is reached.

In this way, perfect starting of the rotating field machine drive is achieved from standstill; the method is equally applicable to a rotating field machine drive already running under load.

DETAILED DESCRIPTION OF THE INVENTION

Figure 1:
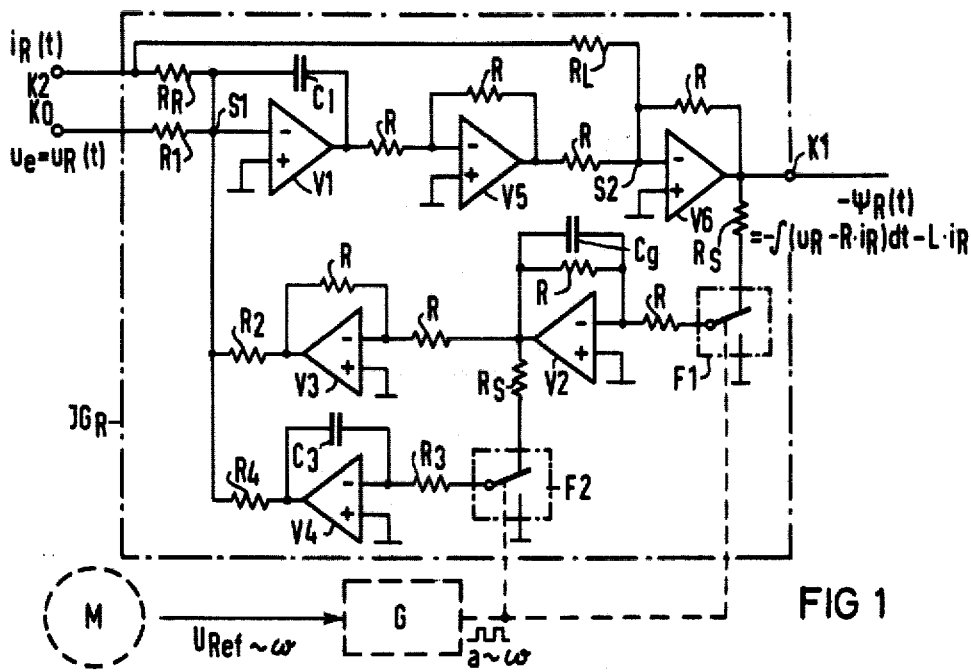
FIG. 1 is a schematic diagram of an AC voltage integretor useful in a rotating field machine drive, in accordance with the teachings of the invention.

FIG. 1 shows an illustrative embodiment of one of two AC voltage integrators $IG_R$ and $IG_S$ used in a rotating field machine drive, according to the teachings of the invention, for forming an electrical signal voltage which is proportional to a flux component in the rotating field machine. Since the two required AC voltage integrators $IG_R$ and $IG_S$ are identical, only the design and operation of AC voltage integrator $IG_R$ will be explained.

As shown, an input voltage $u_e$, proportional to a Y-voltage of the rotating field machine M, is applied to input terminal K0 of integrator $IG_R$. The input voltage $u_e$ is fed to summing junction S1 of integrator V1 via resistor R1. In the example shown in FIG. 1, the voltage is the voltage $u_R$ which is proportional to Y-voltage $U_R$. For compensating the ohmic voltage drop in the stator, a signal $-i_R$, which is proportional to the stator current of the phase R of the rotating field machine M, but inverted, is applied to terminal K2 of the AC voltage integrator $IG_R$ and is connected, via resistor $R_R$, to summing junction S1.

The zero-controller comprises proportional controller V3, I-controller V4, inverting amplifier V2, and multipliers F1 and F2, in a negative-feedback branch.

The output of integrator V1 is connected through an inverting amplifier V5, to another summing junction S2, and, thence, to a summing amplifier V6. The output signal of summing amplifier V6 is the output signal of AC voltage integrator $IG_R$, and can be taken off at output terminal K1. The signal $-i_R$, which is supplied to input terminal K2 of AC voltage integrator $IG_R$, and which is proportional to the current flowing in the phase R and inverted, is brought via the resistor $R_L$, to second summing junction S2. In this way, compensation of the integral of the reactive (inductive stray) voltage drop of synchronous machine M, belonging to phase R, is accomplished at summing junction S2. Inverting amplifier V5 merely serves to reverse the inversion of the output voltage of integrator V1 to supply the correct polarity to summing amplifier V6.

The zero-controller, which is connected between summing junction S2 and output terminal K2 of AC voltage integrator $IG_R$, is designed in such a way that the output signal $u_a$ of summing amplifier V6, corresponding to the flux component, is first fed via a protective resistor $R_S$, (which is ignored in the remaining discussion) to pulse-width multiplier F1, the output signal $U_{eV2}$ of which is fed to the input of inverting amplifier V2. In pulse-width multiplier F1 the input voltage $u_a$ is multiplied by the weighting factor a, which can be varied between the values 0 and 1 in proportion to the frequency $\omega$ of the synchronous machine M. The output voltage $U_{eV2}$ of the pulse-width multiplier F1 is therefore obtained as the product of the weighting factor a, which corresponds to the duty cycle, and the input voltage $u_a$ of the pulse-width multiplier F1. The symbol a is used in the following for both the weighting factor and for the duty cycle.

Feedback resistor R of inverting amplifier V2 is shunted by a capacitor $C_g$ which causes the input signal $U_{eV2}$ of inverting amplifier V2, which is in pulse form because of pulse-width multiplier F1, to be smoothed. The output voltage $U_{aV2}$ of inverting amplifier V2, smoothed in this manner, is fed, in parallel, to the input of proportional controller V3 and, via another protective resistor $R_S$ and second pulse width multiplier F2, to the input of integrating controller V4. Second pulse width multiplier F2 also performs a multiplication by the weighting factor, or duty cycle, a, which is proportional to the frequency $\omega$ of rotating field machine M, and provides an input signal $U_{eV4}$ to integrating controller V4 which is the product of the square of the weighting factor or duty cycle a and the input voltage $u_a$ of the zero controller. Thus, the input signal of proportional controller V3 is weighted by the speed-proportional weighting factor a, and the input signal of integrating controller V4 is weighted by the square of weighting factor a. The output signals of proportional controller V3 and integrating controller V4 are fed to summing junction S1 of integrator V1 via resistors R2 and R4.

FET switches can be used as pulse-width multipliers F1 and F2, the control inputs being fed the output signal of a clock generator G. The output of clock signal G has a duty cycle corresponding to the weighting factor a, being varied between 0 and 1 in proportion to the frequency of the rotating flux vector of rotating field machine M. In this way FET switches F1 and F2 are driven synchronously at the same duty cycle a.

High-quality analog multipliers having low null error and drift can be used instead of the pulse-width multipliers switches F1 and F2 shown. In that case, it is not necessary to smooth the input signal of the second multiplier, since it does not appear in pulse form. In the illustrative example of FIG. 1, in which the two pulse-width multipliers F1 and F2 are operated synchronously and with the same duty cycle a, smoothing is indispensable.

The capacity of capacitor $C_g$ is very small as compared to that of capacitor C3 which determines the time constant of integrating controller V4, so that the line signal remains uninfluenced as far as possible and only the switching frequency corresponding to the duty cycle a is attenuated. Protective resistors $R_S$, in series with the inputs of pulse-width multipliers F1 and F2, serve to protect the preceding summing amplifier V6 and the preceding inverting amplifier V2 against switching transient reactions caused by the pulse-width multipliers. The resistance of resistors $R_S$ is kept very small, as compared to the resistance of the resistors R1 and R3. Inverting amplifier V2 serves merely to reverse the sign of the zero-controller, as is necessary for obtaining negative feedback.

Figure 2:
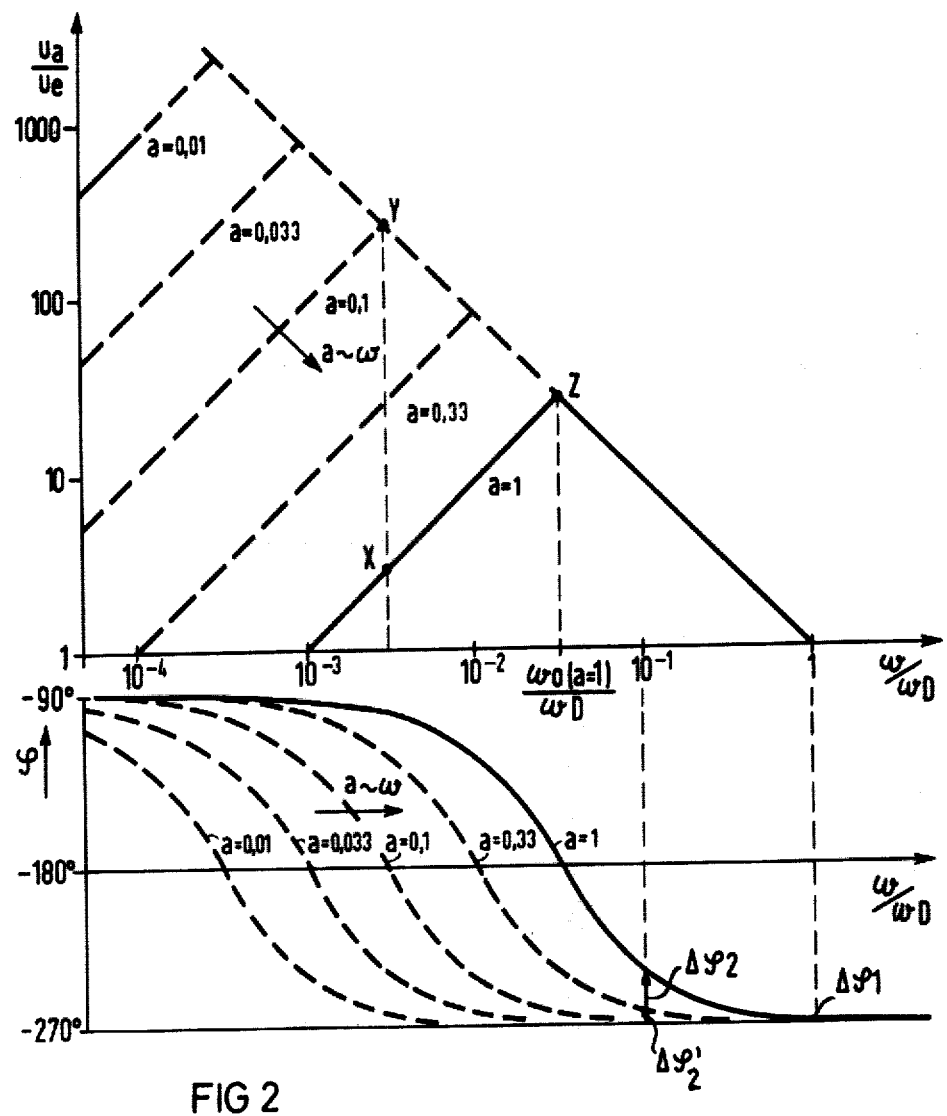
FIG. 2 is a chart which illustrates the frequency response characteristic of the AC voltage integrator shown in FIG. 1.

FIG. 2 illustrates the frequency response for one of the two AC voltage normalization integrators $IG_R$ and $IG_S$ used in a rotating field machine drive according to the invention. It is assumed here that optimization for amplitude (magnitude) was performed, which leads to a damping (attenuation) d=0.7. The frequency plot represents five individual frequency responses for five different values of the weighting factor or duty cycle a, each individual frequency response corresponding to that of a $DT_2$ stage. For the sake of simplification, it is assumed that the signal for compensating the ohmic stator voltage drop and the reactive (inductive stray) voltage, which is supplied to input terminal K2 of the AC voltage integrator, is equal to zero.

In the upper part of FIG. 2, the ratio of output voltage $u_a$ to input voltage $u_e$ of an AC voltage integrator $IG_R$ or $IG_S$ is plotted as a function of the frequency $\omega$ of the synchronous machine M, in a log-log graph. In this presentation, the duty cycle a, corresponding to the weighting factor, serves as the parameter. It is varied in FIG. 2 in steps between 0.01 and 1. The normalized frequency $\omega/\omega_D$ is plotted on the abscissa; in it, $\omega_D$ is the intercept frequency of the AC voltage integrator, i.e., the intersection of the amplitude response with the abscissa.

In the lower part of FIG. 2, the phase shift $\phi$ between the output voltage $u_a$ and the input voltage $u_e$ is also shown as a function of the normalized frequency $\omega/\omega_d$ of rotating-field machine M. Here, too, the duty cycle or weighting factor was varied in steps between the values 0.01 and 1.

Each of the AC voltage integrators $IG_R$ and $IG_S$ exhibits a characteristic frequency $\omega_o$, variable as a function of the frequency of the rotating flux vector, with the pass-through frequency $\omega_D$ and attenuation constant. The characteristic frequency $\omega_o$ is varied by varying the weighting factor or duty cycle a of the two pulse width multipliers F1 and F2. If the characteristic frequency $\omega_o$ is controlled in proportion to frequency $\omega$ and, therefore, to the speed n of the rotating field machine M, then the phase error $\Delta\phi$ of the AC voltage integrators is independent of the speed. The AC voltage integrator described in German Ausleguschrift 26 36 965, cited at the outset, has, in contrast thereto, a rigid, i.e., frequency-independent, characteristic frequency $\omega_o$. Thus, its frequency response corresponds to one of the curves shown in FIG. 2. As an example, let us assume that the frequency response of the known AC voltage integrator corresponds to the frequency response in FIG. 2 for the duty cycle a=1, shown by solid lines. Let us further assume that the nominal frequency of the rotating field machine drive corresponds to $\omega_D$. It is evident from FIG. 2 that the phase error $\Delta\phi_1$, i.e., the deviation of the solid line from the asymptotic value $-270°$ is very small, about 3°. If now the rotating-field machine drive equipped with conventional AC voltage integrators is operated at a frequency $\omega$ reduced by a factor 10, then the value $\Delta\phi_2$, which appears as the phase error, is on the order of 30°. To preclude so large a phase error, it has heretofore been necessary to design the AC voltage integrator to have, for instance, a frequency response like that shown in FIG. 2 for the duty cycle 0.1. This would lead to a reduction of the phase error to the value marked $\Delta\phi_2^1$. However, in the event of beats between the frequency of the rotating field machine M and the line frequency, poorer damping had to be tolerated. For a beat frequency of 0.003 $\omega_D$, the relatively large value marked Y was obtained for the amplitude ratio, as shown in the upper part of FIG. 2. Here it was assumed that the operating frequency $\omega$ of the synchronous machine was $\omega_D$.

With the AC voltage integrators $IG_R$ and $IG_S$ used in a rotating field machine drive in accordance with the invention, the characteristic frequency $\omega_o$ is continuously varied with the actual speed or frequency of the synchronous machine M, so that, at a frequency of the synchronous machine $\omega=\omega_D$, the frequency response of the AC voltage integrator belonging to a duty cycle a=1 applies, and, at a frequency of the rotating field machine M of $\omega=0.1\omega_D$, the curve of the frequency response belonging to a=0.1 applies. As is readily seen from FIG. 2, only very small and constant phase errors $\Delta\phi$ still occur, since with decreasing frequency $\omega$ of the rotating field machine drive, the curves representing the phase of the AC voltage integrator are shifted to the left continuously and proportional to the frequency $\omega$. The phase error lying between the lower part of each curve and the asymptote going through $-270°$ therefore remains small and constant. For the operating case cited as an example above in which $\omega=\omega_D$, the solid curve applies for the amplitude ratio. For a beat frequency of 0.003 $\omega_D$, considerably better damping is obtained, since now the value marked X applies, instead of the value marked Y, for the amplitude ratio.

In the operating case $\omega=\omega_D$ and therefore, a=1, the worst case of a beat is at a beat frequency of 0.03$\omega_D$, where the amplitude ratio $u_a/u_e$ reaches the maximum value marked Z. However, in this operating case $\omega=\omega_D$, a critical beat frequency occurs at 0.003$\omega_D$, when the rotating-field machine drive designed with the AC voltage integrator having the rigid characteristic frequency of German Auslegeschrift No. 26 35 965 is used, and a value Y is obtained for the amplitude ratio $u_a/u_e$ which is considerably larger than Z. In that case, to keep the phase error $\Delta\phi$ within limits, the AC voltage integrator having the fixed characteristic frequency would have to be designed so that its amplitude curve corresponds approximately to that shown in FIG. 2 as a=0.1.

Figure 3:
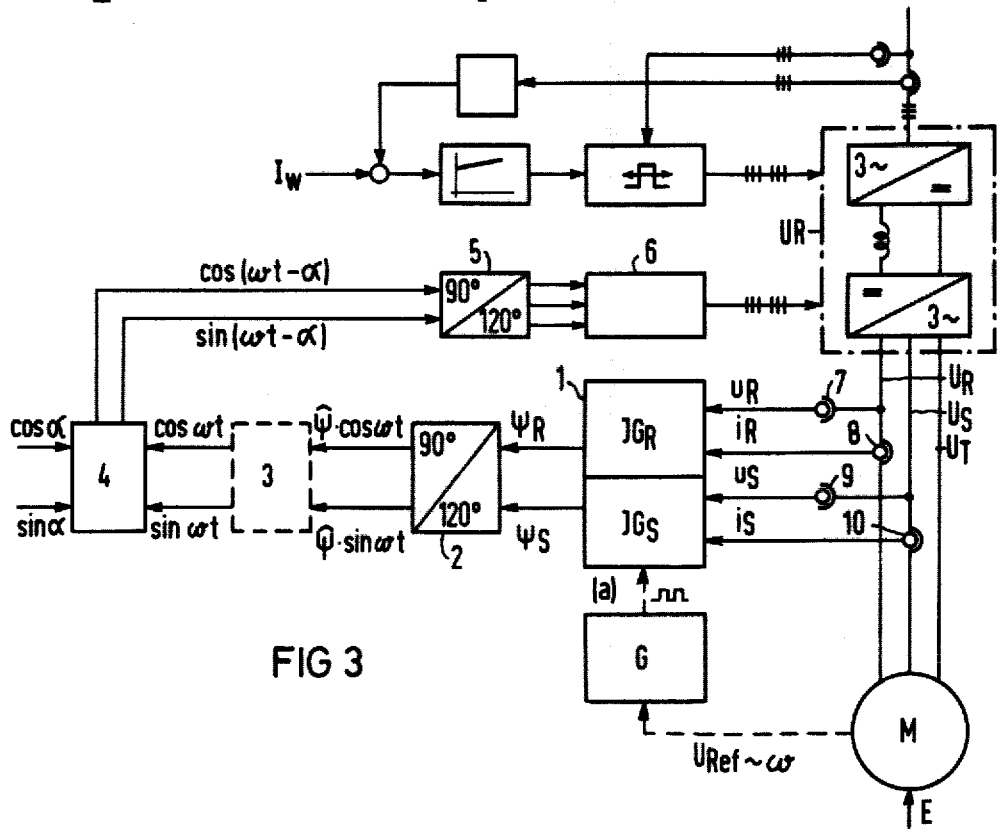
FIG. 3 is a block diagram showing a rotating-field machine drive in the form of a converter motor and associated controls, according to the teachings of the invention.

FIG. 3 is a block diagram showing an illustrative embodiment of rotating field machine drive in the form of a converter motor having associated controls. Here, synchronous machine M is supplied with the phase currents $i_R$, $i_S$ and $i_T$ from a static frequency converter UR. The power stage of such a converter motor is shown, for instance, in German Offenlegungsschrift No. 26 20 992. Block 1 in FIG. 3 comprises two identical voltage integrators, of the type described above in connection with FIG. 1, in which an AC voltage integrator $IG_R$ is associated with phase R and an AC voltage integrator $IG_S$, with phase S. The Y-voltages $U_R$ and $U_S$ are picked up by voltage transformers 7 and 9 and are fed to input terminals K0 (see FIG. 1) of the AC voltage integrators $IG_R$ and $IG_S$. The corresponding currents $I_R$ and $I_S$ are picked up by current transformers 8 and 10 and are fed to inputs K2 (see FIG. 1) of the two AC voltage integrators.

For adjusting the duty cycle a in dependence on the frequency, the control inputs of the FET switches used as the pulse-width multipliers F1 and F2 in both AC voltage integrators $IG_R$ and $IG_S$ are fed from a clock generator G having a clock signal having the duty cycle a. The duty cycle a of clock generator G is determined by a reference voltage $U_{ref}$ which is proportional to the frequency of the synchronous machine M and is supplied, for instance, by a tachometer generator coupled to the synchronous machine. The two AC voltage integrators $IG_R$ and $IG_S$ furnish output voltage signals (at terminal K1 of FIG. 1) representing the flux in two windings, spaced apart 120°, and where $$\phi_R(t) = (u_R - R \times i_R) \times dt - L \times i_R$$

and $$\phi_S(t) = (u_S - R \times i_S) \times dt - L \times i_S.$$

The output of block 1 in FIG. 3 is thus two voltage signals, which are spaced apart 120°, and which represent the flux linked with the two windings of the synchronous machine. These two quantities are converted to a Cartesian coordinate system in a coordinate converter 2, of the kind described, for instance, in Siemens-Zeitschrift No. 45 (1971), no. 10, pages 761 to 764. The outputs of converter 2 are the two components of the revolving flux vector in a fixed 90°-coordinate system. The vector analyzer 3 connected to converter 2, these quantities are further normalized to an amplitude-independent constant value; this normalizing is necessary only in rotating field machine drives having a large range of field-weakening. Such a vector analyzer is described, for instance, in the Dissertation by F. Blaschke entitled "The Field Orientation Method in Rotating-Field Machines;" Technical University-Braunschweig, July 23, 1973. In a vector rotator 4, of the type described in the Siemens-Zeitschrift article cited above, the flux vectors are rotated by the desired control angle $\alpha$. To this end, the desired control angle is set in at the other inputs of vector rotator 4 in Cartesian components (sin $\alpha$ and cos $\alpha$). The Cartesian components of the rotated flux vector appear at the output of vector rotator 4 and are fed to another coordinate converter 5, which transforms the components of the flux vector, rotated by the control angle $\alpha$, back into a 120° coordinate system. It should be noted that, in principle, signal processing is also possible in the 120°-coordinate system without the two coordinate converters 2 and 5, as is described, for instance, in German Offenlegungsschrift No. 26 31 498. Finally, the output signals of coordinate converter 5 are fed to an angle switch 6, of the type described in Siemens-Zeitschrift 45, no. 10, at pages 765 to 769, which determines the firing points for the thyristors of the converter on the machine side and, thereby, the position of the stator excitation vector.

The arrangement for controlling the rectifier on the network side of the converter UR need not be explained in this connection, since it is shown, for instance, in the Swiss journal "Neue Technik" 1974, page 96. Thus, the position of the stator excitation vector can be set in independently of the frequency by a desired control angle $\alpha$, relative to the EMF, or by $\alpha + 90°$, relative to the flux of the synchronous machine. Because the angle errors $\Delta\phi$ of the components of the flux vector, determined by the AC voltage integrators $IG_R$ and $IG_S$, are constant and small, it is possible to utilize the synchronous machine M and the converter UR optimally, for instance, with continuous operation of the inverter at the pull-out limit. Where the AC voltage integrators having frequency-dependent and considerable phase errors $\Delta\phi$, described in German Auslegeschrift No. 26 35 965, are used, on the other hand, a larger margin of safety than the inverter pull-out limit would have to be maintained, and it would be necessary to use a machine and converter having higher rated power to realize the same available power at the shaft of the synchronous machine.

Figure 4:
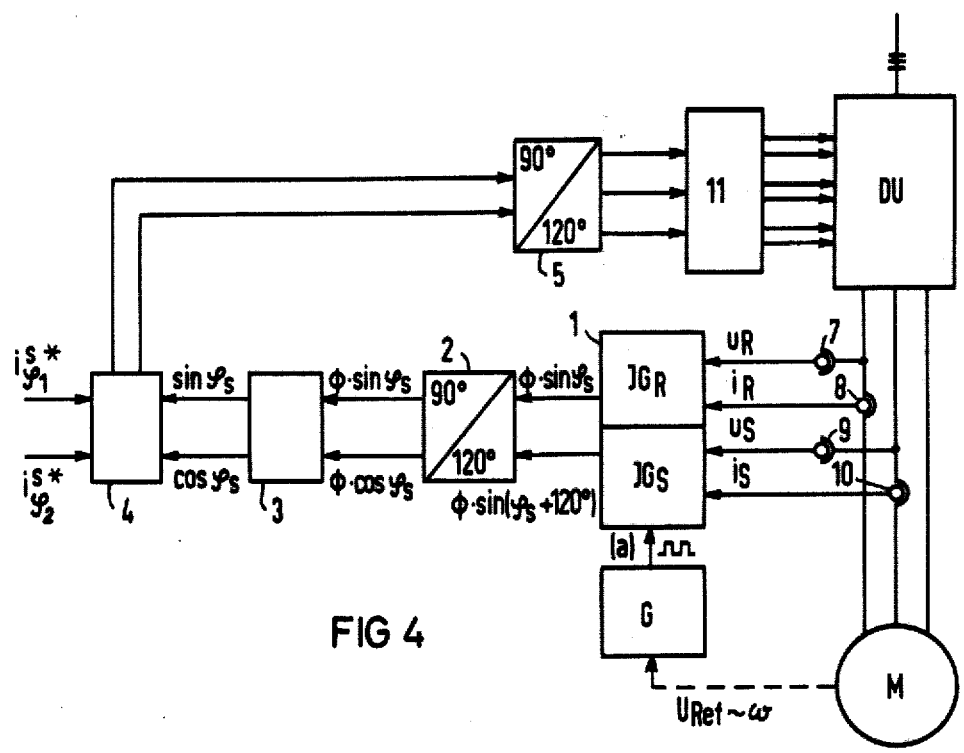
FIG. 4 is a block diagram in which the teachings of the invention are applied to the self-controlled, field-oriented control of a directly converter-fed synchronous machine.

In FIG. 4, the current reference-value input for self-controlled, particularly field-oriented operation of a directly converter-fed synchronous machine, is shown as a further illustrative embodiment of the rotating field machine drive according to the invention. Blocks 1 to 5 in FIG. 4 correspond to blocks 1 to 5 of FIG. 3. The input signals $i\phi_1{}^{s*}$ and $i\phi_2{}^{s*}$ of vector rotator 4 represent the reference values for the Cartesian components of the stator excitation vector revolving with the flux in the coordinate system where $i\phi_1{}^{s*}$ is the component in the flux direction and $i\phi_2{}^{s*}$, the component orthogonal thereto. At the output of vector rotation 4, the reference values for the components of the stator excitation vector, $i_\alpha{}^{s*}$ and $i_\beta{}^{s*}$, are available in the fixed coordinate system. The stator excitation vector therefore is always rotated by a fixed angle which can be set by the components $i\phi_1{}^{s*}$ and $i\phi_2{}^{s*}$ relative to the flux vector of the machine.

In coordinate converter 5, the components $i_\alpha{}^{s*}$ and $i_\beta{}^{s*}$ are converted, in a manner known in the art, into the 120°-system, so that three current reference values $i_R{}^*$, $i_S{}^*$, $i_T{}^*$ for the conductor currents of the machine are available at its output. These are fed to a regulating and control unit 11 for direct frequency converter DU. This kind of regulating and control unit is described, for instance, in Siemens-Zeitschrift 51 (1977), no. 5, pages 416 to 422. It also should be mentioned that a pulse converter may be used instead of the direct converter DU and regulating and control unit 11.

Figure 5:
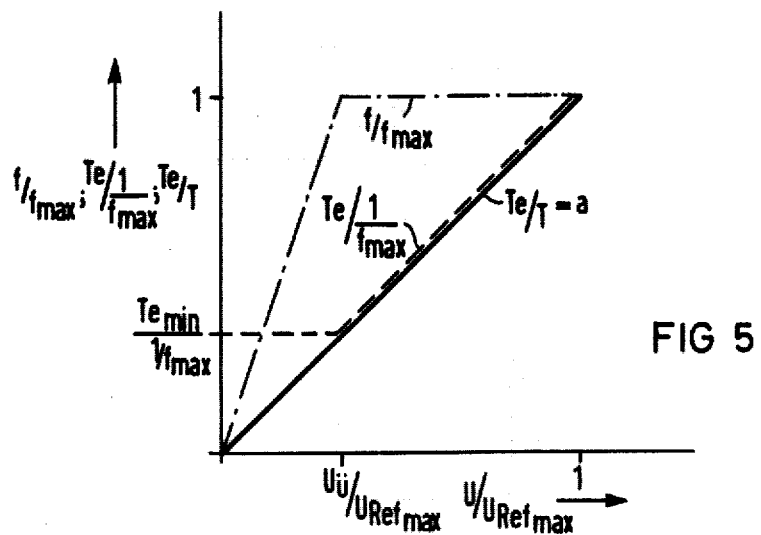
FIG. 5 illustrates the way in which the frequency and pulse width of the clock generator are changed for continuous operation of the controls from start-up to maximum speed.

In order to provide a control range as large as possible for the duty cycle or weighting factor a, a clock generator with pulse frequency and pulse-width adjustment is used as the clock generator G. This is shown diagrammatically in FIG. 5. A reference voltage $U_{ref}$, which is proportional to the speed n, and, therefore, to the frequency $\omega$ of the synchronous machine M, is fed in at the input of clock generator G and is smaller than a transition voltage $U_u{}''$, the frequency is changed (curve $f/f_{max}$). The pulse width $Te_{min}$ remains constant. At a reference voltage $U_{ref}$ which is above the transition voltage $U_u{}''$, the frequency remains constant and the pulse width changes (curve $Te/1/f_{max}$). The transition from frequency to pulse-width variation takes place gradually with respect to the duty cycle. Thereby, a square wave voltage with a duty cycle variable within wide limits is generated (curve Te/T).

This very large control range makes it possible to set in very small duty cycles or weighting factors a including the value zero. For a value zero, the null-controller is completely disengaged from the integrator. This is of importance for localizing the position of the rotor of synchronous machine M at standstill, before the synchronous machine drive is set in operation, since, then, with the stator power supply turned off, merely the induced voltage, which is generated in the stator windings of excitating the field winding of synchronous machine M, is integrated by the integrator. A fully connected zero-controller would tend, in this case, to bring the integrator content to zero and to thereby falsify the exact position localization of the rotor. In the German Auslegeschrift No. 26 35 965 mentioned above, this problem is solved by completely disconnecting the zero controller, and gives rise, when the zero controller is suddenly connected after the machine has been started, to the problems discusses above. On the other hand, the rotating machine drive of the present invention makes possible continuously engaged operation of the zero-controllers from the initial determination of rotor position at start-up which has frequency proportional action, whereby, through the coupling which increases with the duty cycle a or the increase in action of the zero-controller, coupling of the zero-controller which is matched to the frequency of the rotating-field machine M and, thereby a control rate which increases with frequency, can be achieved. At the duty cycle a=1 which occurs at the maximum speed of the rotating field machine drive and, therefore, with the zero-controller fully coupled, the DC components of the output signal of integrator V1 are leveled out at the fastest control rate.

To start the drive with a synchronous machine, according to the present invention, the power supply of the converter control unit is switched on first. Subsequently, the duty cycle is set at a=1 for a short time, so that DC components occurring at the inputs of the AC voltage integrators $IG_R$ and $IG_S$ and which can come, for instance, from the converters, or from null errors of preceding amplifiers, or from integrator V1 itself, are quickly leveled out; thereby the output voltage of the two AC voltage integrators is set to zero to match the flux in the machine. Then, the duty cycle is changed to the value corresponding to the frequency, for instance, a=0, when the synchronous machine is standing still. At the same time, but no earlier, synchronous machine M is excited via the field winding, so that the position of the rotor can be localized. When the desired flux value is reached, the stator current control is released, at last the drive accelerates, and the duty cycle a is now proportional to the machine frequency.

What is claimed is:

1. In a device for a rotating-field machine, especially a synchronous machine supplied from a frequency converter comprising:
    a control for the converter for self-controlled, field-oriented operation of the machine comprising two AC voltage integrators of identical design for forming two electric voltage signals each of which is proportional to a different flux component in the rotating field machine,
    each integrator comprising a zero-controller having negative feedback for suppressing the DC component of the integrator output voltage, the input of each zero-controller being tied to the output of the integrator and the output of each zero-controller being coupled to a summing junction at the input of the integrator, and in which each integrator has, as input voltages, a voltage proportional to a phase voltage belonging to a flux component and a voltage proportional to the phase current in a supply lead, for compensating the ohmic stator voltage drop, and in which another phase current dependent voltage is processed for compensating the inductive stray voltage drop, the improvement comprising:
    each zero controller having a proportional controller and an integrated controller, the output signals of which are fed to the summing junction, and the inputs of which are fed signals, compensated for the ohmic stator voltage drop and the inductive stray voltage drop and weighted, in the case of the proportional controller, by a weighting factor, proportional to the frequency of the rotation flux vector and in the case of the integrated controller by the square of the weighting factor, where the weighting factor has a maximum value of 1.

2. In the drive for a rotating-field machine of claim 1, the further improvement comprising:
    the proportional controller being fed by a first multiplier and the output signal of the first multiplier being also fed through a second multiplier to the input of the integrated controller.

3. In the drive for a rotating field-machine of claim 2, the further improvement comprising:
    the multipliers comprising pulse-width multipliers, and
    the second pulse-width multiplier being preceded by a smoothing stage.

4. The drive for a rotating field machine of claim 3, the further improvement comprising:
    the smoothing stage being a capacitor shunted across an inverting amplifier connected to the first pulse-width multiplier, and
    the output signal of the inverting amplifier being fed to the inputs of the proportional controller and of the second pulse-width multiplier.

5. In a drive for a rotating field machine drive in accordance with claim 4, the further improvement comprising:
    the capacitance of the smoothing stage capacitor being very small in comparison to that of the capacitor in the integrated controller which determines the time constant of the integrated controller.

6. The drive for a rotating-field machine in accordance with any one of the claims 3 to 5, the improvement comprising:
    the pulse-width multipliers being FET switches, and
    the output signal of a clock generator having a duty cycle which is proportional to the frequency of the rotating field machine being fed to the inputs of the pulse-width multipliers.

7. In the drive for a rotating-field machine of claim 6, the further improvement comprising:
    the output of the clock generator being variable, as to frequency, below a transition frequency of the rotating flux vector of the rotating-field machine, and, as to pulse width, above the transition frequency.

8. In the drive for a rotating-field machine of any one of claims 1 to 5, the further improvement comprising:
    a second summing junction at the output of each integrator, to which a signal proportional to the integral of the inductive stray voltage drop of the stator winding is fed.

9. A method for operating the drive of a rotating-field machine having a frequency inverter in which a control for the inverter for self-controlled field-oriented operation of the machine has two AC voltage integrators of identical design for forming two electric voltage signals each of which is proportional to a different flux component in the rotating-field machine, each integrator comprising a zero-controller having negative feed-back for suppressing the DC component of the integrator voltage,
    the input of each zero-controller being tied to the output of the integrator and the output of each zero-controller being coupled to a summing junction at the input of the integrator, and in which each integrator has, as input voltages, a voltage proportional to a phase voltage belonging to a flux component and a voltage proportional to the phase current in a supply lead, for compensating the ohmic stator voltage drop, and in which another phase-current-dependent voltage is processed for compensating the inductive stray voltage drop,
    each zero controller having a proportional controller and a integrated controller, the output signals of which fed to the summing junction, and the inputs of which are fed signals, compensated for the ohmic stator voltage drop and the inductive stray voltage drop and weighted, in the case of proportional controller, by a weighting factor, and, in the case of the integrated controller, by the square of the weighting factor, where the weighting factor is proportional to the frequency of the rotating flux vector and has a maximum value of 1, comprising the following steps being taken, upon starting a synchronous machine, in time sequence:

(a) first, the power supply of the converter control is switched on;
(b) thereupon, the weighting factor is briefly set to 1;
(c) then, the weighting factor is set to the value corresponding to the instantaneous frequency of the synchronous machine;
(d) at the same time, but no earlier, the synchronous machine is excited via the field winding; and
(e) the stator current control is released when the desired flux value is reached.

10. A method for operating the drive of a rotating-field machine having a frequency inverter in which a control for the inverter for self-controlled field-oriented operation of the machine has two AC voltage integrators of identical design for forming two electric voltage signals each of which is proportional to a different flux component in the rotating-field machine, each integrator comprising a zero-controller having negative feedback for suppressing the DC component of the integrator voltage, the input of each zero-controller being tied to the output of the integrator and the output of each zero-controller being coupled to a summing junction at the input of the integrator, and in which each integrator has, as input voltages, a voltage proportional to a phase voltage belonging to a flux component and a voltage proportional to the phase current in a supply lead, for compensating the ohmic stator voltage drop, and in which another phase-current-dependent voltage is processed for compensating the inductive stray voltage drop, each zero controller having a proportional controller and a integrated controller, the output signals of which fed to the summing junction, and the inputs of which are fed signals, compensated for the ohmic stator voltage drop and the inductive stray voltage drop and weighted, in the case of proportional controller, by a weighting factor, and, in the case of the integrated controller, by the square of the weighting factor, where the weighting factor is proportional to the frequency of the rotating flux vector and has a maximum value of 1, the proportional controller being fed by a first pulse-width multiplier and the output of the first multiplier being also fed, via a smoothing stage, through a second multiplier to the input of the integrated controller, comprising the following steps being taken, upon starting a synchronous machine, in time sequence:

(a) first, the power supply of the converter control is switched on;
(b) thereupon, the weighting factor is briefly set to 1;
(c) then, the weighting factor is set to the value corresponding to the instantaneous frequency of the synchronous machine;
(d) at the same time, but no earlier, the synchronous machine is excited via the field winding; and
(e) the stator current control is released when the desired flux value is reached.

11. A method for operating the drive of a rotating-field machine having a frequency inverter in which a control for the inverter for self-controlled field-oriented operation of the machine has two AC voltage integrators of identical design for forming two electric voltage signals each of which is proportional to a different flux component in the rotating-field machine, each integrator comprising a zero-controller having negative feedback for suppressing the DC component of the integrator voltage, the input of each zero-controller being tied to the output of the integrator and the output of each zero-controller being coupled to a summing junction at the input of the integrator, and in which each integrator has, as input voltages, a voltage proportional to a phase voltage belonging to a flux component and a voltage proportional to the phase current in a supply lead, for compensating the ohmic stator voltage drop, and in which another phase-current-dependent voltage is processed for compensating the inductive stray voltage drop, each zero controller having a proportional controller and a integrated controller, the output signals of which fed to the summing junction, and the inputs of which are fed signals, compensated for the ohmic stator voltage drop and the inductive stray voltage drop and weighted, in the case of proportional controller, by a weighting factor, and, in the case of the integrated controller, by the square of the weighting factor, where the weighting factor is proportional to the frequency of the rotating flux vector and has a maximum value of 1, the proportional controller being fed by a first pulse-width multiplier and the output of the first multiplier being also fed, via a smoothing stage, through a second multiplier to the input of the integrated controller, the smoothing stage being a capacitor which has a very small capacitance in comparison to that of the capacitor in the integrated controller which determines the time constant of the integrated controller, the smoothing capacitor being shunted across an inverting amplifier connected to the first pulse-width multiplier, and the output of the inverting amplifier being fed to the input of the proportional controller and of the second pulse-width multiplier, comprising the following steps being taken, upon starting a synchronous machine, in time sequence:

(a) first, the power supply of the converter control is switched on;
(b) thereupon, the weighting factor is briefly set to 1;
(c) then, the weighting factor is set to the value corresponding to the instantaneous frequency of the synchronous machine;
(d) at the same time, but no earlier, the synchronous machine is excited via the field winding; and
(e) the stator current control is released when the desired flux value is reached.

12. A method for operating the drive of a rotating-field machine having a frequency inverter in which a control for the inverter for self-controlled field-oriented operation of the machine has two AC voltage integrators of identical design for forming two electric voltage signals each of which is proportional to a different flux component in the rotating-field machine, each integrator comprising a zero-controller having negative feedback for suppressing the DC component of the integrator voltage, the input of each zero-controller being tied to the output of the integrator and the output of each zero-controller being coupled to a summing junction at the input of the integrator, and in which each integrator has, as input voltages, a voltage proportional to a phase voltage belonging to a flux component and a voltage proportional to the phase current in a supply lead, for compensating the ohmic stator voltage drop, and in which another phase-current-dependent voltage is processed for compensating the inductive stray voltage drop, each zero controller having a proportional controller and a integrated controller, the output signals of which fed to the summing junction, and the inputs of which are fed signals, compensated for the ohmic stator voltage drop and the inductive stray voltage drop and weighted, in the case of proportional controller, by a weighting factor, and, in the case of the integrated controller, by the square of the weighting factor, where the weighting factor is proportional to the frequency of the rotating flux vector and has a maximum value of 1, the proportional controller being fed by a first pulse-width multiplier and the output of the first multiplier being also fed, via a smoothing stage, through a second multiplier to the input of the integrated controller, the smoothing stage being a capacitor which has a very small capacitance in comparison to that of the capacitor in the integrated controller which determines the time constant of the integrated controller, the smoothing capacitor being shunted across an inverting amplifier connected to the first pulse-width multiplier, and the output of the inverting amplifier being fed to the input of the proportional controller and of the second pulse-width multiplier, the pulse-width multiplier being FET switches, the output signal of the clock generator having a duty cycle which is proportional to the frequency of the rotating-field machine and which is variable, as to frequency, below a transition frequency of the rotating flux vector of the rotating-field machine, and as to pulse-width, above the transition frequency, the clock generator output being fed to the inputs of the pulse-width multipliers, there being a second summing junction at the output of each integrator to which a signal proportional to the integral of the inductive stray voltage drop of the stator winding is fed, comprising the following steps being taken, upon starting a synchronous machine in time sequence:

(a) first, the power supply of the converter control is switched on;

(b) thereupon, the weighting factor is briefly set to 1;

(c) then, the weighting factor is set to the value corresponding to the instantaneous frequency of the synchronous machine;

(d) at the same time, but no earlier, the synchronous machine is excited via the field winding; and (e) the stator current control is released when the desired flux value is reached.

13. In the drive for a rotating-field machine of claim 6, the further improvement comprising:

a second summing junction at the output of each integrator, to which a signal proportional to the integral of the inductive stray voltage drop of the stator winding is fed.

14. In the drive for a rotating-field machine of claim 7, the further improvement comprising:

a second summing junction at the output of each integrator, to which a signal proportional to the integral of the inductive stray voltage drop of the stator winding is fed.

* * * * *